J. W. CULMER.
SCALE PENDULUM.
APPLICATION FILED AUG. 5, 1907.

910,646.

Patented Jan. 26, 1909.

WITNESSES

INVENTOR
John W. Culmer

UNITED STATES PATENT OFFICE.

JOHN W. CULMER, OF CLEVELAND, OHIO.

SCALE-PENDULUM.

No. 910,646.

Specification of Letters Patent.

Patented Jan. 26, 1909.

Application filed August 5, 1907. Serial No. 387,229.

*To all whom it may concern:*

Be it known that I, JOHN W. CULMER, a citizen of the United States, residing at Cleveland, in the county of Cuyahoga and State of Ohio, have invented a new and useful Scale-Pendulum, of which the following is a specification.

My invention relates to improvements in scale pendulum in which the weight of a load upon the load bearing member of a scale is automatically counterbalanced by the gyration of a loaded arm pivotally connected with said load bearing member; and the objects of my invention are, first, to provide a pendulum which shall be moved through equal increments of arc for equal increments of weight upon the load bearing member; second, to afford facilities for the close adjustment of the pendulum at all points of justment of the pendulum; and, third, to afford means for the adjustment of the two parts of the pendulum relatively to each other.

Figure 1:
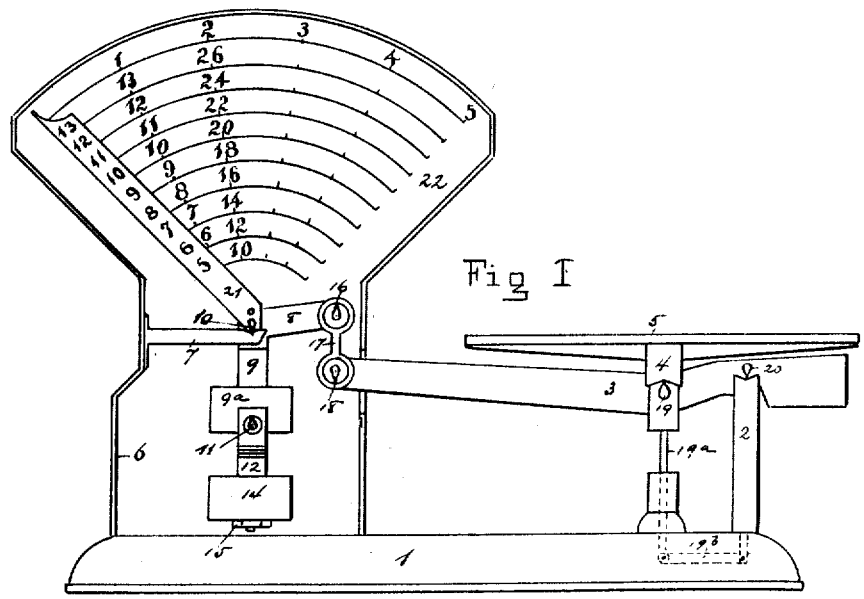
Figure 2:
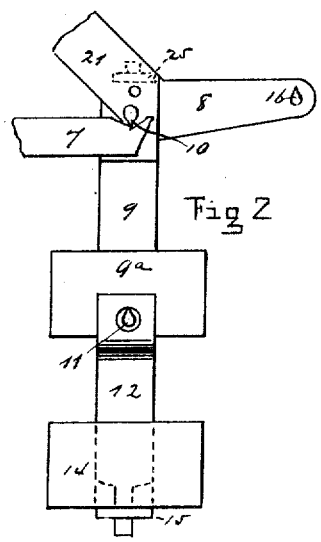

In the accompanying drawings; Figure 1 is a front view, in projection, of a scale embodying the invention; Fig. 2 is an enlarged view of the pendulum, and Fig. 3 is an end view of Fig. 2.

Like figures refer to similar parts throughout all the views.

Upon a base 1 and at or near one end of said base a vertical support 2 has its upper portion fitted with seats for the reception of the pivots 20, only one of which is shown in Fig. 1; but a similar pivot to 20 and also to 19 are drawn into the beam 3 opposite to those shown. The beam 3 rests upon the seats of the column 2, and a crotch 4 having a vertical stem 19ª rests upon the pivots 19 in the beam 3 which is extended to a length determined by the leverage desired and fitted with a point pivot 18. At the opposite end of the base 1, a frame 6 is mounted thereon, and, made fast to said frame and projecting horizontally beyond the vertical center thereof bars 7 are fitted with seats for the pivot 10 of a pendulum; within the upper portion of the frame 6 and concentric with the knife edge of the pivot 10 a chart 22 is made fast and is ruled and marked in concentric scales of weights and values as is common to such scales, except that in this instance the divisions are of equal arcs for equal increments of weight or value.

Figure 3:
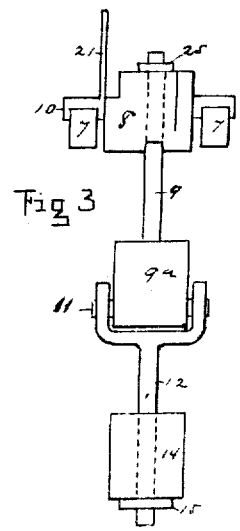

Seated upon the bars 7 is a pendulum composed of a block or head 8 having a pivot 10 resting upon seats in said arms 7, and having a projection through which the pivot 16 is driven for connection with the beam 3; a bar 9 passes through a vertical slot in the block 8 as shown in dotted lines in Fig. 3, and at its upper end is threaded for the nut 25 by means of which the bar 9 may be raised or lowered relatively to the pivot 10; at its lower end the bar 9 has a block or weight 9ª through which a pivot 11 is driven and the bifurcated bar 12 hangs upon said pivot 11, a block 14 is slotted centrally to receive the bar 12 and the lower end of said bar is threaded and provided with the nut 15 by means of which said block 14 may be moved relatively to the pivot 11; a pointer or indicator 21 is attached to the pivot block 8 its reading edge in radial alinement with the edge of the pivot 10, and is moved across the chart 22 and closely parallel thereto by the movement of the pendulum. A plate 5 is mounted upon the crotch 4 and a stem 19ª extends downwardly within the base 1, and is connected there with a boss vertically below the fulcrum bearing pivots 20, by beams of a link 19ᵇ, as shown in dotted lines in Fig. 1.

In the ordinary form of pendulum where the block or weight, corresponding to 9ª in the drawings, is of the requisite weight to counterbalance the full load as indicated on the chart 22, it is requisite that each increment on the chart should be of a smaller arc than the preceding one, because with each increment of load upon the weight receiver the pendulum moves a greater proportion of its weight into vertical opposition to the load, and, consequently does not move through so great an arc; in my invention the weight is divided and one half or more is suspended pivotally from the other and rigid portion, and, by this device the vertical line of the weight is the vertical line of the pivot 11 and the pendulum is moved through equal arcs for equal increments of load.

The beam pivot 18 is coupled to the pendulum pivot 16 by the link 17. When the scale is assembled and load placed upon the load receiver 5, if the pendulum is too weak and permits the pointer 21 to pass the proper indication on the chart 22 the weight 9ª is lowered by means of the nut 25, and, if too strong and the indicator falls short of the proper point on the chart the weight is raised by the same means until the proper adjustment is obtained; in like manner the weight 14 may be raised or depressed, by means of the nut 15, and the accurate indication of the weight upon the receiver 5 be obtained upon the chart 22 by the adjustment of the two weights relatively to the pivots from which they depend.

I claim as my invention;

1. In a scale, a weight bearing member, a frame supporting said member, a case mounted upon the frame, an equally spaced chart in the case, a pivotally supported block in the case, a vertically adjustable weight passing within a slot in said block, a second weight pivotally supported from said first named weight, a pointer upon the block and a link connecting said block with the weight receiver as shown and described.

2. In a scale, a base, a beam supported on the base, a case mounted on the base, a chart in the case, a pivotally supported block in the case, a pointer upon the block parallel with the chart, a weight passing through a normally vertical slot in the block, a screw upon said weight, a nut threaded upon said screw above the block, a second weight pivotally suspended from said first named weight, a screw for the vertical adjustment of said second weight relatively to its supporting pivot, and a link connecting the block with the beam, as shown and described.

3. A pendulum for weighing machines, comprising a pivotally supported block, a weight rotated by the block and adjustable vertically in relation thereto, a second weight pivotally suspended from the first weight and adjustable vertically in relation thereto, a pointer upon the block, and a link connecting said block with the weight carrier of a weighing machine, as shown and described.

4. In a weighing machine, a base, a beam pivotally supported on the base, a weight receiver pivotally supported on the beam, a case mounted upon the base, a chart fitted upon the case, a pendulum comprising a pivotally supported block, a weight adjustable relatively to the block and moved thereby and a second weight pivotally suspended from the first named weight within the case, an indicator upon the block, and a link connecting said block with the beam, as shown and described.

5. A divided weight pendulum comprising a pivotally supported block, a weight moving positively with and adjustable vertically in relation to said block, a bifurcated bar pivotally suspended from said weight, a second weight vertically adjustable upon said bar, and a link connecting said block with the weight bearer of a weighing machine, as shown and described.

Signed at Corinth, Miss. this 30th day of July 1907.

JOHN W. CULMER.

Witnesses:
J. C. SWAIM, Jr.,
JNO. G. PANKEY.